INVENTORS
LAWRENCE J. LAUCK
THEODORE R. KOBLISH

ATTORNEY

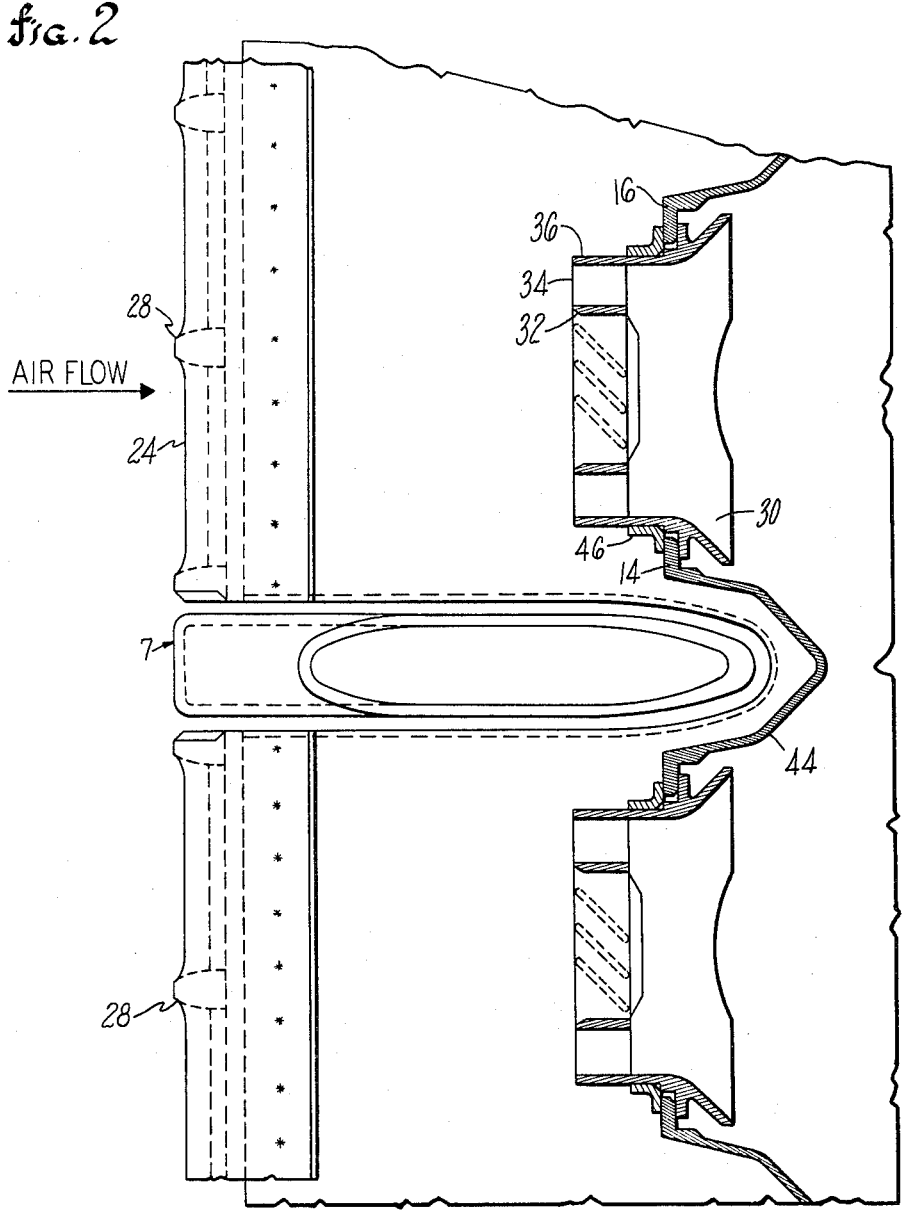

May 28, 1968 T. R. KOBLISH ETAL 3,385,055
COMBUSTION CHAMBER WITH FLOATING SWIRLER RINGS
Filed Nov. 23, 1966 3 Sheets-Sheet 3
fig.5
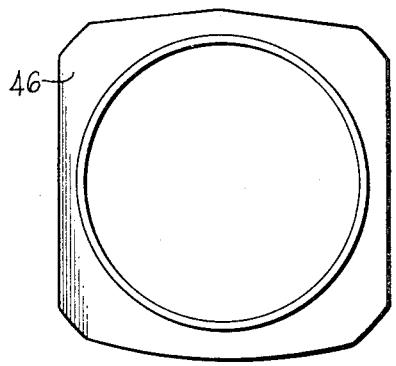
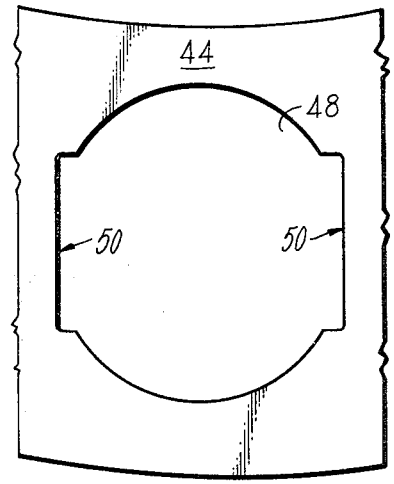
fig.4
fig.3
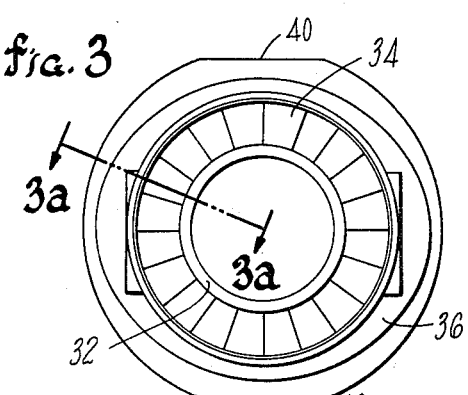
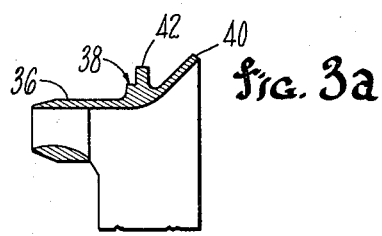
fig.3a
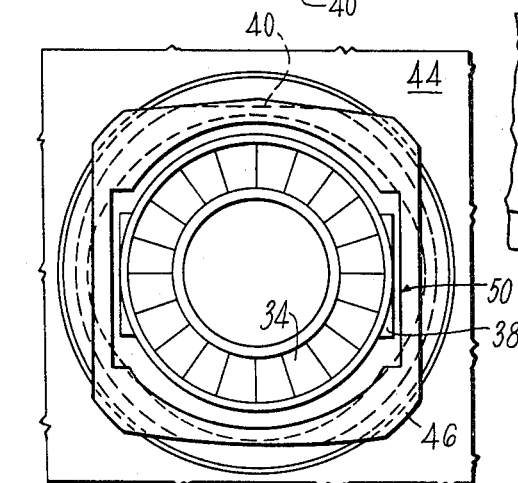
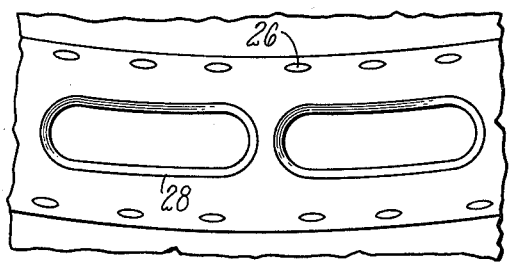
fig.7
fig.6

3,385,055
COMBUSTION CHAMBER WITH FLOATING
SWIRLER RINGS
Theodore R. Koblish, Wallingford, and Lawrence J.
Lauck, Wapping, Conn., assignors to United Aircraft Corporation, East Hartford, Conn., a corporation of Delaware
Filed Nov. 23, 1966, Ser. No. 596,675
5 Claims. (Cl. 60—39.69)

ABSTRACT OF THE DISCLOSURE

An annular combustion chamber in which the swirler rings within the combustion chamber are axially restrained while being free to move radially, the radial movement being sufficient to accommodate the thermal expansion of the annular chamber walls thereby insuring that at maximum power conditions the center lines of the fuel nozzle, swirler vanes and combustion chamber are coaxial.

---

This invention relates to gas turbine engines and more particularly to the structure of an annular combustion chamber wherein the motive gases for driving a turbine are produced.

As gas turbine power plants have increased in size and power, the dimensions of combustion chambers have also necessarily increased proportionally to accommodate the greater flow of air through the power plant. One result of the increased length of the combustion chamber is that the entire power plant has become excessively long and accordingly difficult to assemble. It is therefore a feature of this invention to provide an arrangement whereby the forward end of the combustion chamber and the compressor diffuser case occupy the same axial engine length thereby reducing the overall engine length.

For the most efficient combustion within a combustion chamber, the fuel should be atomized and then thoroughly mixed with the primary air while the flame is stabilized. Flame stabilization presents a problem in that flame speeds are generally low and the air velocity is relatively high. In order to provide mixing type air velocity, swirl vanes coannular with the fuel nozzles are employed. These swirl vanes serve the dual function of stabilizing and holding the flame, i.e., a flame which is fixed spatially and does not travel continuously through the medium, and of thoroughly mixing the fuel and air. To this extent, then, it is a further object of this invention to provide an arrangement whereby the fuel and air are thoroughly mixed and the flame within the combustion chamber is stabilized.

The engine operating condition that requires the most efficient combustion is the cruise or maximum power condition and correspondingly, this is the condition that the swirl vanes have to be most effective, that is, the swirl vanes should be concentric with the fuel nozzles. However, due to the thermal expansion of the combustion chamber during burning, the swirl vanes seldom attain this position. It is still a further object of this invention to provide an arrangement whereby the swirl vanes within the combustion chamber are kept concentric with the fuel nozzles, particularly at maximum power conditions.

FIGURE 2 is a top sectional view of the combustion chamber showing the device of the invention thereof.

FIGURE 3 is an end elevation of the swirler ring.

FIGURE 3a is a fragmentary sectional view along line 3—3.

FIGURE 4 is an elevation of the deflector ring.

FIGURE 5 is an end elevation of the swirler cup retaining ring.

FIGURE 6 is an end elevation of the swirler ring, deflector ring and retaining ring in the hot position.

FIGURE 7 is an end fragmentary sectional view of the combustion chamber.

Figure 1:
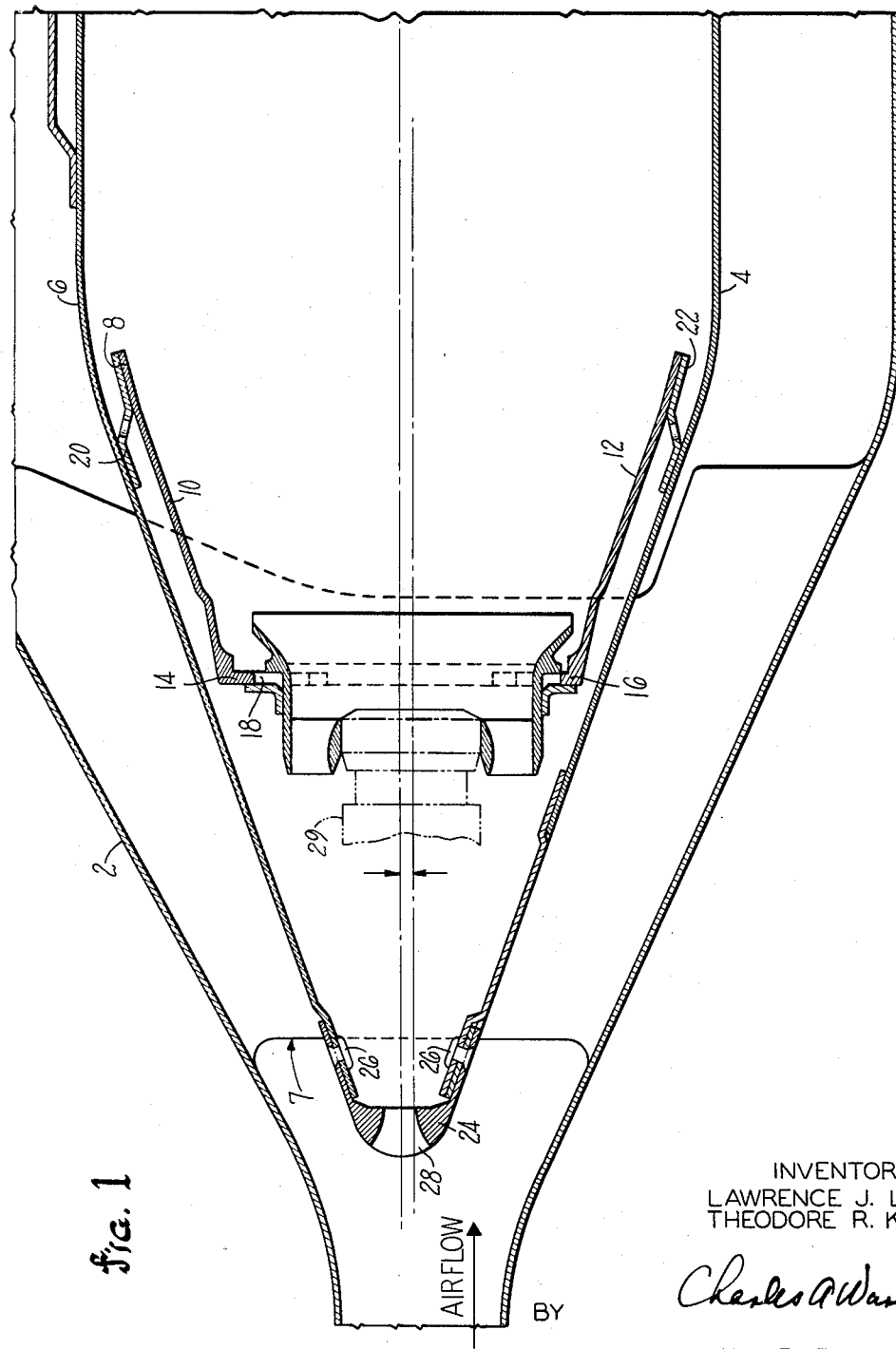
FIGURE 1 is a section view of the combustion chamber showing the device of the invention thereof.

The invention is shown in a diffuser case 2 which is intended to be located between the compressor and turbine of a gas turbine power plant. A power plant to which this type of combustion chamber is applicable is disclosed, for example, in the Savin Patent No. 2,747,367.

As best shown in FIGURE 1, the combustion chamber is annular in form consisting of an outer wall 4 and an inner wall 6. These walls are supported by a number of diffuser struts 7. These walls enclose a number of flame tubes 8 arranged in a ring within the inner and outer annular walls 6 and 4. Each flame tube 8 is substantially cup shaped and consists of an inner ring 10 and outer ring 12. Inner ring 10 has an inwardly projecting flange 14 and outer ring 12 has an inwardly projecting flange 16, and together flange 14 and flange 16 form opening 18. Inner ring 10 is connected to inner wall 6 at its downstream end by a Z-shaped ring 20 and outer ring 12 is connected to outer wall 4 at the downstream end by a Z-shaped ring 22. Z-shaped rings 20 and 22 have openings so that primary combustion air can be conducted through these openings thereby cooling the inner and outer annular walls and the flame cup 8.

Connected to the leading edge of the combustion chamber is a contoured nose piece 24. This nose piece is a U-shaped member and is connected to inner wall 6 by rivet or bolt 26 and to outer wall 4 by rivet or bolt 26. The nose or U-shaped member is located in the diffuser case contoured in such a manner that the compressor discharge flow is split equally between the inner wall 6 and outer wall 4 without any turbulence or breakaway. This nose piece 24 contains a number of slots 28, FIGURE 7, these slots being located in this particular embodiment such that there are two slots for each fuel nozzle 29. Also, the slots are positioned such that the center line of the fuel nozzle is equidistant from the center line of each adjacent slot 28. The purpose of slots in the nose piece is to provide primary combustion air with a higher total pressure upstream of swirler 30, hereinafter described, than is normally provided in a combustion chamber of this type. Other combustion chambers, of the type hereinafter described, have openings in the side walls rather than in the nose piece and in providing primary combustion air through these side holes experience a pressure drop and a corresponding reduction in swirler and combustion efficiency. It is understood that the nose piece 24 can be fabricated from sheet metal; however, in the embodiment shown nose piece 24 is fabricated from machined bar. This enables the nose piece to have a greater resistance to sonic deterioration resulting from the high frequency noise from the upstream compressor.

Positioned between flame cup flanges 14 and 16 are a number of swirler rings 30. Each swirler as shown in FIGURES 1, 2, 3 and 3a has an inner sleeve 32, an outer annular housing 36 and extending between the inner sleeve 32 and the outer annular housing 36 are indiviual swirler vanes 34. The downstream end of housing 36 is flared outwardly and terminates in flat clearance surfaces 40 (FIGURE 3). The outer annular housing 36 has a stepped flange, the inner step 38 and the outer step 42 extending radially outward from housing 36.

Normally in a combustion chamber of the type herein described adjacent swirlers impart a rotational flow of opposite directions to the primary air as it leaves the adjacent swirlers. In the embodiment of the present invention, the individual vanes 34 of swirlers 30 are arranged such that all the swirlers within the combustion chamber impart the same direction of rotation to the primary air as it leaves the swirlers. More particularly, in the present embodiment the primary air has a clockwise direction of rotation as it leaves the swirlers. It is to be understood that by reversing the position of individual vanes 34 that a counterclockwise direction of flow could be imparted to the primary air. The result of causing the rotational flow of the primary air to be in the same direction, i.e., all clockwise rather than clockwise from one swirler and counterclockwise from an adjacent swirler is the avoidance of any local hot spots in the combustion chamber.

Deflector ring 44 is best shown in FIGURE 4 and retaining ring 46 is best shown in FIGURE 5. When assembling the swirler 30 within the combustion chamber, the swirler is inserted through opening 48 in deflector 44. The inner diameter of opening 48 has cutouts 50, and the inner step 38 cooperates within cutouts 50. After the swirler has been inserted through deflector ring 44, the retaining ring 46 is then fixedly connected to the outer diameter of annular housing 36. The retaining ring is attached to the housing 36 in such a manner that it and the outer step 42 form a slot therebetween. Inwardly projecting flanges 14 and 16 abut against these flanges so that the swirler 30 is fixed axially within the combustion chamber. The swirler 30 is free to move radially due to tolerance between inner step 38 and the inwardly projecting flanges 14 and 16.

In operation, each fuel nozzle 29 is positioned within swirler 30 so that the center line of each fuel nozzle and each swirler is coaxial. The center line of the fuel nozzle and swirler are accordingly offset from the combustor axis or center line. The amount of offset is determined by the amount of thermal expansion that can be expected from the inner 6 and outer 4 annular walls. In a typical combustion chamber the amount of offset is in the order of .090 inch. As the combustion chamber heats up, the walls will expand and because of the tolerance between the inner step 38 and the inwardly projecting flanges, the center lines of the combustion chamber, fuel nozzles and swirler will become coaxial (see FIGURE 6). Thus, the most efficient combustion operation is provided at peak engine operation.

It is to be understood that the invention is not limited to the specific description above or to specific figures shown, but may be used in other ways without departure from its spirit as defined by the following claims.

We claim:
1. In an annular combustion chamber having inner and outer walls, a plurality of cup-shaped flame tubes fixedly connected to said inner and outer walls and having an opening in its upstream end, a ring of fuel nozzles, a plurality of swirler rings, each of said nozzles supporting and being positioned within a forwardly protruding portion of said swirlers, said forwardly protruding portion extending through said opening in each of said flame tubes, wherein the improvement comprises:

means for restraining said swirler axially while allowing said swirler to move radially, the center line of said swirler being offset from the combustor axis an amount at least equal to the thermal expansion of said inner and outer annular walls, so that said swirler center line will be coaxial with said combustor axis during combustor operation.

2. In a construction as in claim 1 wherein said means comprise:
a first outwardly projecting flange connected to said swirler ring,
a second outwardly projecting flange connected to said swirler ring, said first and second flanges forming a slot therebetween, and
an inwardly projecting flange connected to said flame tube, said inwardly projecting flange abutting against said first and second flanges and cooperating slidably within said slot between said first and second flanges.

3. In a construction as in claim 2, which includes:
a plurality of Z-shaped rings connected between said flame tube and said inner and outer annular walls, said Z-shaped rings having openings for the passage of cooling air.

4. In a construction as in claim 1, which includes:
positioning the individual swirler vanes within each of said swirlers so that the rotational flow direction of the primary combustion air as it leaves each of said swirlers is the same through said combustion chamber.

5. In an annular combustion chamber having inner and outer walls, a plurality of cup-shaped flame tubes fixedly connected to said inner and outer walls and having an opening in its upstream end, a ring of fuel nozzles, a plurality of swirler rings, each of said nozzles supporting and being positioned within a forwardly protruding portion of said swirlers, said forwardly protruding portion extending through said opening in each of said flame tubes, wherein the improvement comprises:
said inner and outer annular walls being joined together by a U-shaped member, said U-shaped member having a forwardly projecting portion, said forwardly projecting portion having a plurality of slots so that high pressure air is provided upstream of said swirler rings, and
means for restraining said swirler axially while allowing said swirler to move radially, the center line of said swirler being offset from the combustor axis an amount at least equal to the thermal expansion of said inner and outer annular walls, so that said swirler center line will be coaxial with said combustor axis during combustor operation.

References Cited
UNITED STATES PATENTS

| | | | |
|---|---|---|---|
| 2,800,768 | 7/1957 | Wheeler | 60—39.74 |
| 3,032,990 | 5/1962 | Rogers | 60—39.74 |

JULIUS E. WEST, *Primary Examiner.*